(12) United States Patent
Bhimaraj et al.

(10) Patent No.: US 8,436,076 B2
(45) Date of Patent: May 7, 2013

(54) METHOD FOR PRODUCING POLYESTER NANOCOMPOSITES

(75) Inventors: Praveen Bhimaraj, Chandler, AZ (US); Crayton Gregory Toney, Wrentham, MA (US); Linda S. Schadler-Feist, Niskayuna, NY (US); Richard W. Siegel, Menands, NY (US)

(73) Assignees: Rensselaer Polytechnic Institute, Troy, NY (US); Albany International Corp., Rochester, NH (US)

( * ) Notice: Subject to any disclaimer, the term of this patent is extended or adjusted under 35 U.S.C. 154(b) by 1328 days.

(21) Appl. No.: 11/845,497

(22) Filed: Aug. 27, 2007

(65) Prior Publication Data
US 2008/0113189 A1 May 15, 2008

Related U.S. Application Data

(60) Provisional application No. 60/840,091, filed on Aug. 25, 2006.

(51) Int. Cl.
*C08K 9/00* (2006.01)
*C08G 63/60* (2006.01)
*B32B 17/10* (2006.01)

(52) U.S. Cl.
USPC ............ 523/200; 524/499; 524/601; 428/339

(58) Field of Classification Search .................. 523/200, 523/212, 214, 216–217; 524/599, 601; 428/339, 428/404–407; 423/335, 625
See application file for complete search history.

(56) References Cited

U.S. PATENT DOCUMENTS

| | | | |
|---|---|---|---|
| 5,494,949 A * | 2/1996 | Kinkel et al. | 523/212 |
| 6,194,489 B1 * | 2/2001 | Nikkeshi et al. | 523/212 |
| 2001/0033934 A1 * | 10/2001 | Port et al. | 428/421 |
| 2004/0106720 A1 | 6/2004 | Jerome et al. | |
| 2004/0180193 A1 * | 9/2004 | Oda et al. | 428/328 |
| 2006/0083694 A1 * | 4/2006 | Kodas et al. | 424/46 |
| 2007/0274931 A9 * | 11/2007 | Buseman-Williams et al. | 424/59 |

FOREIGN PATENT DOCUMENTS

| | | |
|---|---|---|
| CN | 1268528 A | 10/2000 |
| EP | 0467549 | 1/1992 |
| EP | 0909786 | 4/1999 |

OTHER PUBLICATIONS

International Search Report for PCT/US2007/076885.
The State Intellectual Property Office of P.R. China, Application No. 200780038669.8, Title: Method for Preparing Polyester Nancocomposites, First Notification of Office Action.

* cited by examiner

*Primary Examiner* — Hannah Pak
(74) *Attorney, Agent, or Firm* — Heslin Rothenberg Farley & Mesiti P.C.

(57) ABSTRACT

A method for preparing a polyester nanocomposite is presented. The method comprises coating nanoparticles with a dicarboxylic acid. Combining the dicarboxylic acid coated nanoparticles with a coupling agent resulting in a first mixture. Then combining the first mixture with a polyester to form a polyester nanocomposite. The resulting polyester nanocomposite has among other properties a glass transition temperature greater than the polyester itself and also a crystallization temperature less than the polyester itself.

14 Claims, 7 Drawing Sheets fig. 1 fig. 2 fig. 3 fig. 4 fig. 5 fig. 6 fig. 7

METHOD FOR PRODUCING POLYESTER NANOCOMPOSITES

CROSS-REFERENCE TO RELATED APPLICATIONS

This application claims priority from U.S. Provisional Application Ser. No. 60/840,091, filed Aug. 25, 2006, the entire contents of which are incorporated herein by reference.

FEDERALLY SPONSORED RESEARCH

The following invention was made with Government support under grant/contract number 0117792 awarded by the National Science Foundation. The government has certain rights.

FIELD OF THE INVENTION

Then invention relates to polyester nanocomposites and methods of preparation thereof.

BACKGROUND OF THE INVENTION

Nanoparticles have been explored as fillers in polymers to improve various properties such as mechanical, thermal, electrical, and barrier properties. The driving force for the use of nanofillers is the enormous specific surface area that can be achieved as the size of the fillers reduces to less than 100 nm. Nanoparticles possess orders of magnitude higher specific surface area than their micron and macro sized counterparts. This can lead to two relevant phenomena. First, there is an increased area of interaction between the filler and the matrix. Secondly, there is a region surrounding each particle in which the polymer behaves differently from the bulk. The volume fraction of this "interaction zone (IZ)" can be larger than the volume fraction of particles and the properties of the IZ contribute to the change in properties. The increased interaction can have a variety of effects. It can lead to a change in the glass transition temperature ($T_g$) and the load transfer from the polymer to the fillers. In the case of a semicrystalline polymer, the increased interaction can result in a change in the crystallization behavior such as the crystallization temperature ($T_c$).

However, the extent of these changes depends on the interface between the fillers and the polymer. In general, a stronger interface results in better load transfer and a higher $T_g$. The route to achieving a strong interface is to alter the surface of the nanoparticles by coating it with molecules that are either compatible or can bond to the polymer molecules. Most attempts to alter the surface of nanoparticles involve coating the nanoparticle surface with coupling agents such as silanes or phosphonic acids that have one end group that is adsorbed on the particle surface and the other end group that is compatible with the polymer molecule. Then bonding is achieved by grafting a polymer on a filler that involves reacting the coupling agent with a monomer molecule followed by polymerization. While this method has shown promising results, problems associated with the foregoing include difficulty in controlling the molecular weight and molecular weight distribution.

Alternative methods have been used to increase the glass transition temperature of a polymer, such as a polyester, to improve its thermal stability. One method is to blend the polyester with another polyester having a higher $T_g$. For instance, PET ($T_g$~80° C.) has been blended with polyethylene naphthalate (PEN), which has a $T_g$ of 130° C. A disadvantage of this process is the high cost of polyesters with higher $T_g$. Co-polymerization is another route employed for increasing $T_g$ of polyesters. Copolymers of PET with PEN have been prepared and the $T_g$ increases with increasing naphthalene units. PET has also been co-polymerized with 5-nitroisophthalic units (PETNI) to obtain increases in glass transition by up to 6° C. for 50% NI content. But this method requires a high percentage of comonomer units to achieve appreciable changes.

A need exists for polymers filled with nanoparticles, i.e., polymer nanocomposites, and methods of preparation thereof that overcome at least one of the aforementioned deficiencies.

SUMMARY OF THE INVENTION

An aspect of the present invention relates to a method for the preparation of polyester nanocomposites comprising: coating nanoparticles with a dicarboxylic acid; combining the dicarboxylic acid coated nanoparticles with a coupling agent resulting in a first mixture; and combining the first mixture with a polyester to form a polyester nanocomposite having a glass transition temperature greater than the polyester and a crystallization temperature less than the polyester.

DETAILED DESCRIPTION OF THE INVENTION

Throughout this specification the terms and substituents are defined when first introduced and retain their definitions.

A method for preparing a polyester nanocomposite is presented in accordance with the present invention. The method comprises coating nanoparticles with a dicarboxylic acid. Combining the dicarboxylic acid coated nanoparticles with a coupling agent resulting in a first mixture. Then combining the first mixture with a polyester to form a polyester nanocomposite. The resulting polyester nanocomposite has among other properties a glass transition temperature greater than the polyester itself and also a crystallization temperature less than the polyester itself.

Nanoparticles useful in the present invention include those selected from the group consisting of a metal oxide, a non-metal oxide, a non-metal compound, a semi-metal oxide, and a semi-metal compound. Examples of metal oxides include alumina, titania, zirconia, antimony tin oxide, cerium oxide, copper oxide, indium oxide, indium tin oxide, iron oxide, silicon dioxide, tin oxide, yttrium oxide, zinc oxide, barium oxide, calcium oxide, chromium oxide, magnesium oxide, molybdenum oxide, neodymium oxide, and strontium oxide.

Examples of non-metal oxides or compounds include silicon oxide, silicon nitride, silicon carbide, silicon carbonitride, silicon oxynitride, silicon oxycarbonitride, germanium oxide, germanium nitride, germanium carbide, germanium carbonitride, and germanium oxynitride, germanium oxycarbonitride. Examples of semi-metal oxides or compounds include bismuth oxide, bismuth nitride, bismuth carbide, bismuth carbonitride, bismuth oxynitride, bismuth oxycarbonitride, beryllium oxide, beryllium nitride, beryllium carbide, beryllium carbonitride, beryllium oxynitride, and beryllium oxycarbonitride.

The average particle size of the nanoparticles used in the present invention is in a range from 1 nm to 100 nm. The particle size may vary in ranges from a lower limit of 10 nm, 20 nm, or 30 nm to an upper limit of 70 nm, 80 nm, or 90 nm. All ranges of the average particle size are inclusive and combinable. The term "average particle size" refers to particle size as determined by electron microscopy methods or by surface area measurements. Removing large particles before being coated with a dicarboxylic acid can narrow the particle size distribution of the nanoparticles. Large particles may be removed by settling or sedimentation techniques, for example by centrifugation.

The foregoing nanoparticles are coated with a dicarboxylic acid. The coating step consists of chemisorption of a dicarboxylic acid onto the surface of the nanoparticles via surface hydroxyl groups so that one carboxylic acid group of each dicarboxylic molecule is free. Examples of dicarboxylic acids that are used in accordance with the present invention include terephthalic acid, isophthalic acid, o-phthalic acid, 1,3-naphthalenedicarboxylic acid, 1,4-naphthalenedicarboxylic acid, 4,4'diphenyldicarboxylic acid, 4,4'diphenylsulphonedicarboxylic acid, and diphenyl ether 4,4'-dicarboxylic acid. Typically phthalic acids are used such as terephthalic acid, isophthalic acid, or o-phthalic acid.

After the nanoparticles are coated with a dicarboxylic acid, the coated nanoparticles then are combined with a coupling agent to afford a first mixture. The coupling agent is selected from the group consisting of a carbodiimide, an epoxide, and an anhydride. Typically a carbodiimide, such as polycarbodiimide is coupled with the coated nanoparticles.

The first mixture then is combined with a polyester to form a polyester nanocomposite. The coupling agent present in the first mixture reacts with both the free carboxyl of the dicarboxylic acid that is chemisorbed on the nanoparticles and a carboxylic end of the polyester. The reactions take place in-situ during the combining of the first mixture with the polyester. The mechanism of combining is accomplished by melt mixing of the foregoing. Typically, the polyester nanocomposite comprises from 4%-10% of the first mixture.

Polyesters that are useful for combination with the first mixture are selected from the group consisting of poly(ethylene terephthalate), poly(cyclohexylenedimethylene terephthalate), poly(ethylene dodecate), poly(butylene terephthalate), poly(ethylenenaphthalate), poly(ethylene 2,7-naphthalate), poly(methaphenylene isophthalate), poly(glycolic acid), poly(ethylene succinate), poly(ethylene adipate), poly(ethylene sebacate), poly(decamethylene azelate), poly(decamethylene sebacate), poly(dimethylpropiolactone), poly(ethylene isophthalate), poly(tetramethylene terephthalate), poly(hexamethylene terephthalate), poly(decamethylene terephthalate), poly(1,4-cyclohexane dimethylene terephthalate)(trans), poly(ethylene 1,5-naphthalate), poly(ethylene 2,6-naphthalate), and poly(1,4-cyclohexylene dimethylene terephthalate). Typically, the polyester used for combination with the first mixtures is poly(ethylene terephthalate).

In an embodiment of the present invention, a polyester copolymer is combined with the first mixture to form a polyester nanocomposite. A polyester copolymer is a polymer derived from two different monomeric species. In the example of a polyester copolymer, one species is a polyester monomer and the second species is any compatible monomer species other than a polyester monomer.

In another embodiment of the present invention, a mixture of a polyester and another polymer is combined with the first mixture to form a polyester nanocomposite. The second polymer may be a different polyester or a polymer that is compatible for use in the polyester nanocomposites of the present invention.

EXPERIMENTAL

Materials

Alumina nanoparticles having an average particle size of 38 nm and a specific surface area of 50 $m^2/gm$ were obtained from Nanophase Technologies Corp. The dicarboxylic acid, terephthalic acid (TA), was purchased from Aldrich chemicals in powder form and was used as received. Ethanol (200 proof) was obtained from Fisher chemicals and trifluoroacetic acid (TFA) was obtained from Sigma-Aldrich. All reagents were used as received. The coupling agent, aromatic polycarbodiimide (Stabaxol 100), was obtained from Rheinchemie chemicals.

Testing Methods

Differential Scanning Calorimetry (DSC) analysis was carried out using a Mettler Toledo DSC822e instrument. Measurements of glass transition temperatures using DSC were carried out on amorphous samples prepared by quenching from the melt. Glass transition temperatures of semicrystalline polymers are often dependent on the crystallinity of the matrix and true indication of the strength of the interface can be obtained only through study of amorphous samples. A scanning rate of 10° C./min was used for these measurements.

Weight loss upon heating was analyzed by Thermo-Gravimetric Analysis (TGA) and measured with a Mettler Toledo TGA. The samples were heated at a rate of 110° C./min for these measurements.

EXAMPLES

Example 1

The alumina nanoparticles were first dispersed in ethanol by simultaneously sonicating with an ultrasonic probe and stirring for 7 minutes. An appropriate quantity of TA was added to the dispersion and heated close to the boiling point of ethanol to ensure maximum solubility of TA in ethanol. The quantity of TA added to the dispersion compared to the amount of alumina nanoparticles is in a ratio having a range of 1:4 to 4:1. In choosing the ratio of TA to alumina nanoparticles, the artisan will recognize that any ratio within the foregoing range can be used in which TA coats the alumina nanoparticles is promoted. The nanoparticles may be minimally coated, coated in their entirety, or in any amount in between the foregoing. Refluxing of the mixture with stirring was continued for 4 hours. The solvent was then removed by heating the mixture accompanied by rigorous stirring. Drying in vacuum for a minimum of 24 hours ensured complete removal of solvent and resulted in the isolation of TA-coated nanoparticles as a powder.

The TA-coated nanoparticles were dispersed in trifluoroacetic acid (TFA) by sonicating and stirring simultaneously for 7 minutes. An appropriate quantity of polycarbodiimide (pCDI) was dissolved in this solution by slowly stirring in the pCDI. Poly(ethylene terephthalate), PET, of quantity sufficient to ultimately make a nanocomposite master batch with 20 wt % nanoparticles was dissolved separately in TFA by stirring. In choosing the quantity of pCDI, the artisan will recognize that any amount of pCDI can be used which ultimately results in the preparation of the nanocomposite master batch having a requisite wt % of nanoparticles. The necessary amount can be determined by the amount of starting materials present or by the amount of nanocomposite master batch ultimately needed. The term "requisite" is used to connote a need or a want, and not used to connote a requirement or absolute parameter.

The two solutions then were mixed together under rigorous stirring. The nanocomposite master batch was precipitated out from the resulting solution by adding it drop-wise to methanol chilled with an ice-water mixture (anti-solvent). Washing several times with methanol followed the foregoing step. The nanocomposite master batch was dried under vacuum at 110° C. for a minimum of 48 hours.

The nanocomposite master batch obtained was then diluted to a requisite concentration by melt mixing with PET pellets in a ThermoHaake PolyDrive batch melt mixer at 260° C. with a screw rotation speed of 80 rpm for 7 minutes in an argon atmosphere. The reaction between TA and pCDI, and simultaneous reaction between pCDI and PET were realized in-situ during the melt mixing process resulting in formation of a polyester nanocomposite.

Example 2

Alumina nanoparticles were dispersed in 0.5% weight/volume (w/v) of ethanol by sonication using an ultrasonic probe and simultaneous stirring for 7 minutes. TA, at a concentration of 4% weight/weight (w/w) of alumina, was added to the dispersion with continued stirring. The solution was refluxed with rigorous stirring for a minimum of 4 hours to ensure complete adsorption. The solvent was then removed by evaporation at 65° C. and the residual powder was dried under vacuum at 110° C. for a minimum of 24 hours. The TA-coated nanoparticles were dispersed in 2% w/v of TFA by sonicating and stirring simultaneously for 7 minutes. Poly-CDI was dissolved in the foregoing solution by slow addition under vigorous stirring. A ratio of pCDI to TA of 4:1 was used. PET (to make a nanocomposite master batch with 20 wt % nanoparticles) was dissolved separately in TFA at a concentration of 10% w/v by stirring. After complete dissolution, the two solutions were mixed together under rigorous stirring. The nanocomposite master batch was precipitated out from the resulting solution by adding it drop-wise to methanol (anti-solvent), followed by washing several times with methanol. The nanocomposite master batch was dried under vacuum at 110° C. for a minimum of 48 hours. The nanocomposite master batch was then melt mixed with an appropriate amount of PET pellets to produce polyester nanocomposites with a requisite percentage of nanoparticles.

Results

Figure 1:
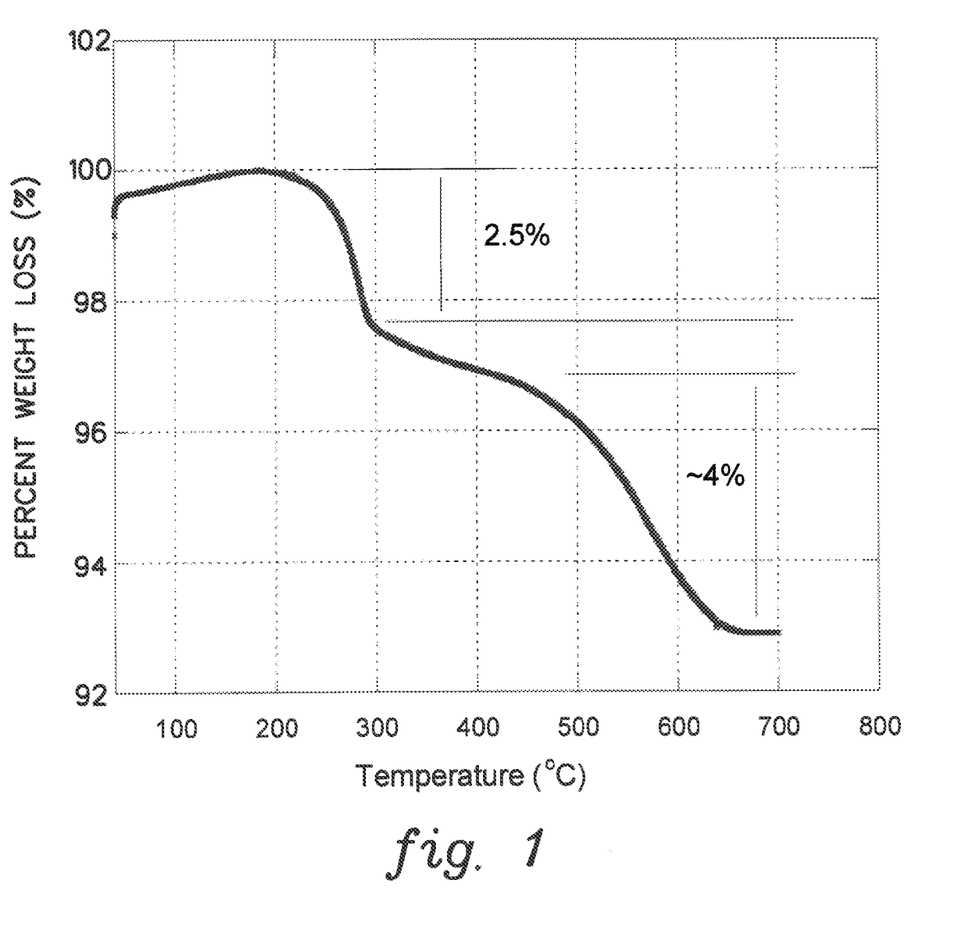
FIG. 1 is a Thermo-Gravimetric Analysis (TGA) plot of sample weight vs. temperature, in accordance with the present invention.

The coating of TA on the surface of the nanoparticles was characterized by TGA. The TGA of particles coated with 7 wt % TA is depicted in FIG. 1. TA sublimes at ~300° C. However, for the 7 wt % TA coated nanoparticles, only 2.5% weight loss occurs at ~300° C. This corresponds to the free terephthalic acid. Approximately 4 wt % loss occurs at temperatures greater than 500° C. This indicates that this fraction of the TA does not sublime and is strongly adsorbed to the particle surface.

Figure 2:
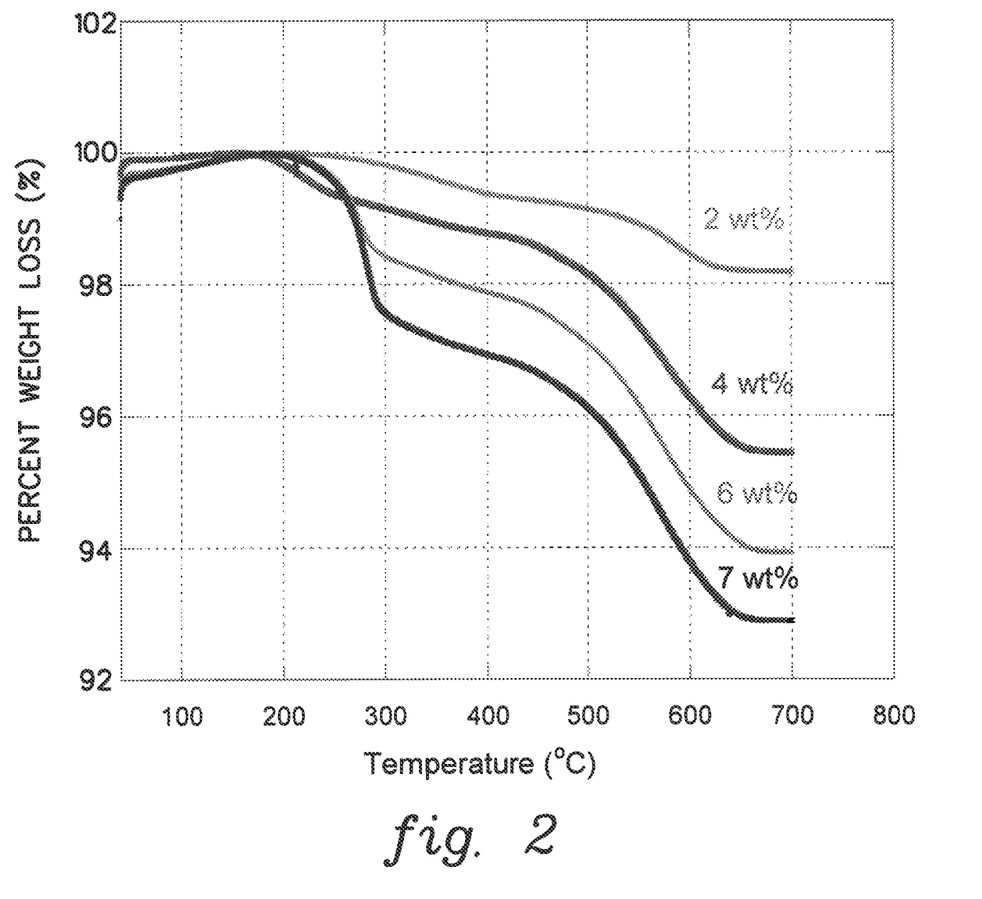
FIG. 2 is a TGA plot of weight vs. temperature for terephthalic acid (TA) coated nanoparticles having varying percentages of TA in accordance with the present invention.

The TGA curves for 2, 4, 6 and 7 wt % TA coated alumina particles are depicted in FIG. 2. For all samples with TA coatings of more than 4 wt %, there are two weight loss regions: one at ~300° C. and one starting at 500° C., where 4 wt % loss occurs. For the particles coated with TA content of 4 wt % or less, the entire weight loss occurs at temperatures>500° C. This demonstrates that the complete monolayer surface coverage of TA on 38 nm alumina nanoparticles is 4 wt %. This corresponds to a coverage of 0.246 mmol of TA per gm of alumina or 0.0492 mmol/m$^2$ surface of alumina.

Figure 3:
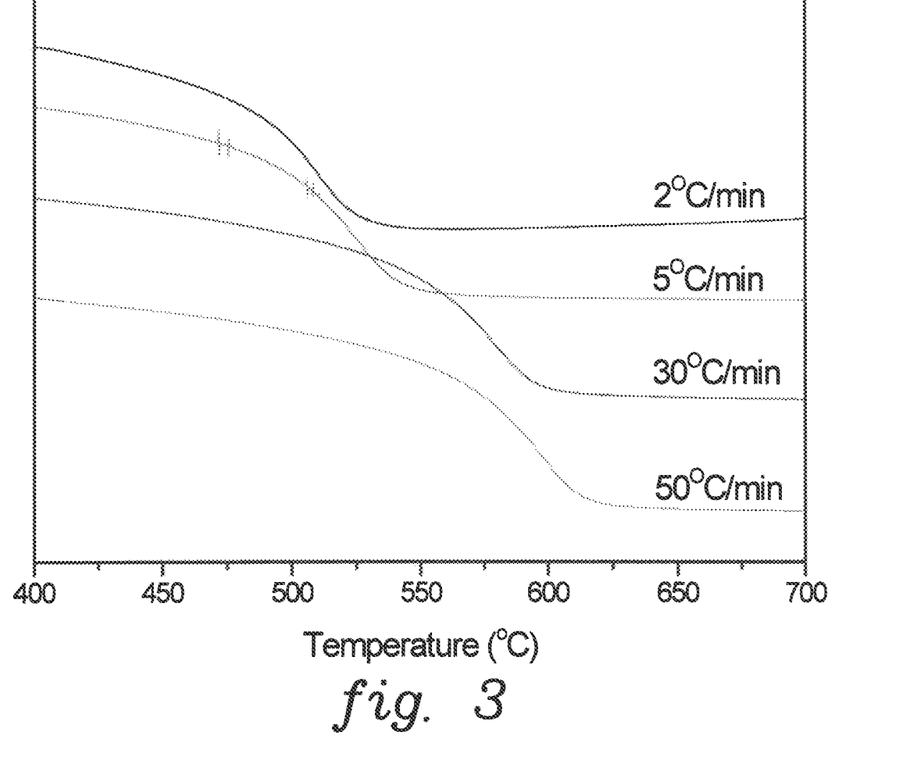
FIG. 3 is a TGA plot of percent weight loss vs. temperature for TA coated nanoparticles at varying heat rates in accordance with the present invention.

Kissinger analysis was used to estimate the kinetics of removal of chemisorbed TA on heating. FIG. 3 depicts the TGA weight loss curves of 4 wt % TA treated alumina at heating rates of 2, 5, 30 and 50° C./min. Using the values of temperatures for weight loss, the activation energy is calculated to be 220 KJ/mol. This high value of the activation energy indicates that the TA is strongly anchored to the alumina surface and the optimum surface coverage on alumina surface corresponds to 4-wt % TA.

Figure 4:
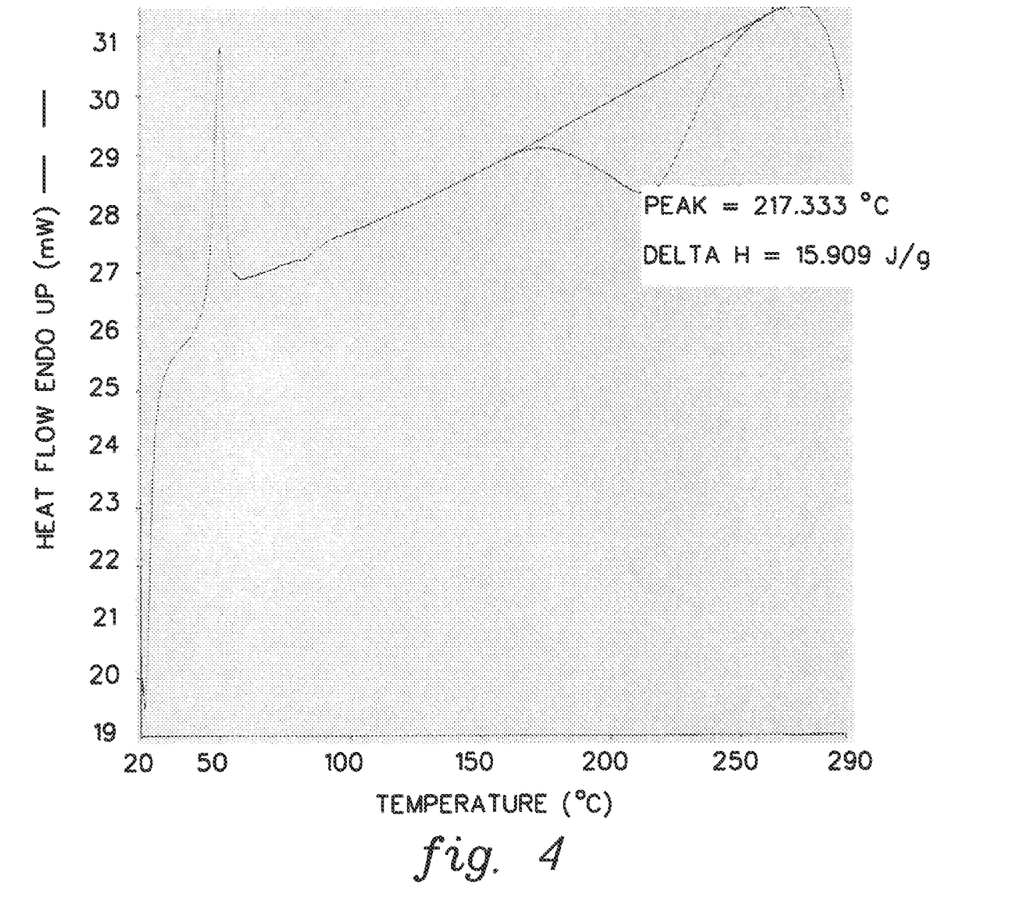
FIG. 4 is a Differential Scanning Calorimetry (DSC) plot of heat flow vs. temperature of TA and polydicarbodiimide (pCDI) in accordance with the present invention.

The reaction between the TA and the pCDI was followed using DSC. FIG. 4 depicts the DSC curve of a mixture of as-received TA and pCDI. The endothermic peak at ~50° C. corresponds to melting of the pCDI in the mixture. There is a second peak at ~217° C. that is exothermic. TA does not sublime at this temperature and furthermore, sublimation is endothermic. This peak indicates that TA reacts with pCDI at ~217° C. The heat of reaction was calculated by integrating to get the area under this peak.

Figure 5:
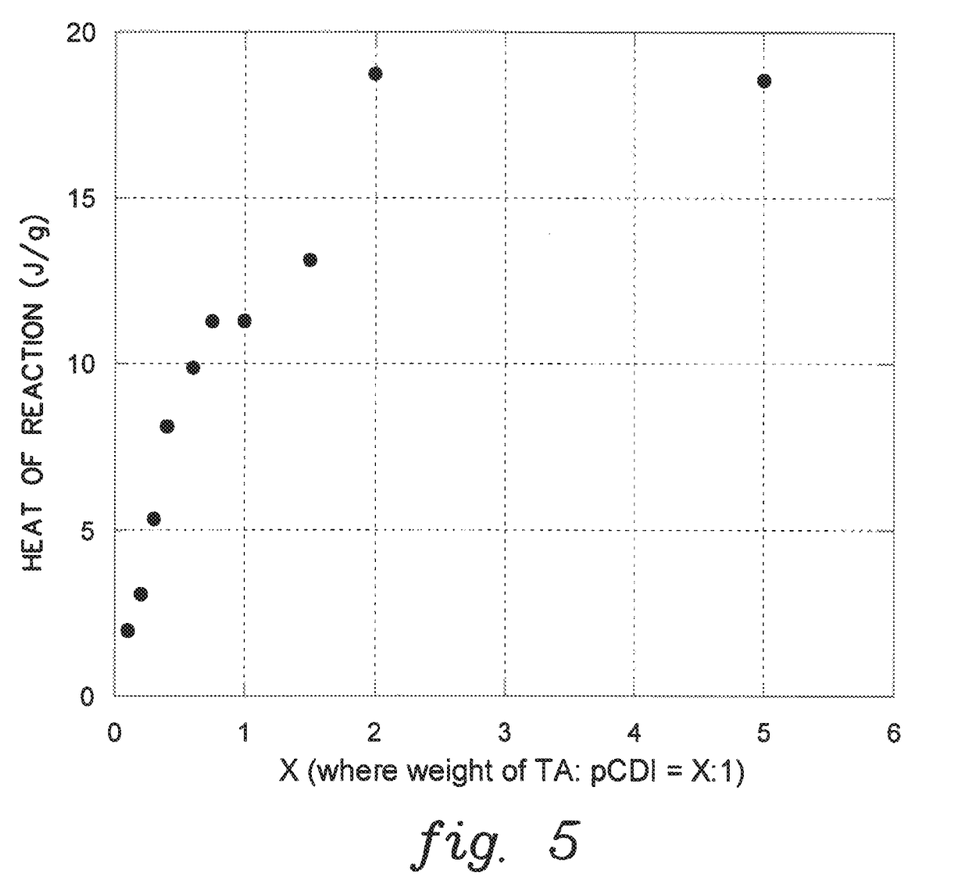
FIG. 5 is a plot of heats of reaction vs. the ratio of TA to pCDI in accordance with the present invention.

The heats of reaction measured for different ratios of as-received TA to pCDI are depicted in FIG. 5. With increasing ratio of TA to pCDI, the heat of the reaction increases, reaches a maximum, and then starts to decrease. The TA has reacted with the pCDI for ratios more than 2:1.

For the TA chemisorbed on the alumina surface, only half the total carboxylic acid groups are available to react with the pCDI (the other half is chemisorbed to the alumina surface). Hence, a ratio of chemisorbed TA to pCDI of 1:4 would correspond to the minimum amount of pCDI required to completely react with the adsorbed TA. An excess of pCDI was employed to ensure complete utilization of carboxylic acid groups. The 1:4 ratio of TA to pCDI is not meant to limit the minimum amount of pCDI that can be used in an embodiment of the present invention. The foregoing 1:4 ratio corresponds to the minimum amount of pCDI required to completely react with adsorbed TA.

In an embodiment of the present invention, all the adsorbed TA is not required to react with the pCDI to form the first mixture. Ratios of TA to pCDI less than 1:4 may be used to from the first mixture and ultimately a polyester nanocomposite. The ratios of TA to pCDI for use in the present may vary in ranges from a lower limit of 1:1.5, 1:2, or 1:3 to an upper limit of 3:1, 2:1, or 1:1. All ranges of the foregoing ratios are inclusive and combinable.

Poly-CDI is used during PET processing to prevent degradation due to hydrolysis. It stabilizes the PET by capping its carboxylic acid end group. The reaction between pCDI and PET occurs under melt mixing at ~260° C.

Figure 6:
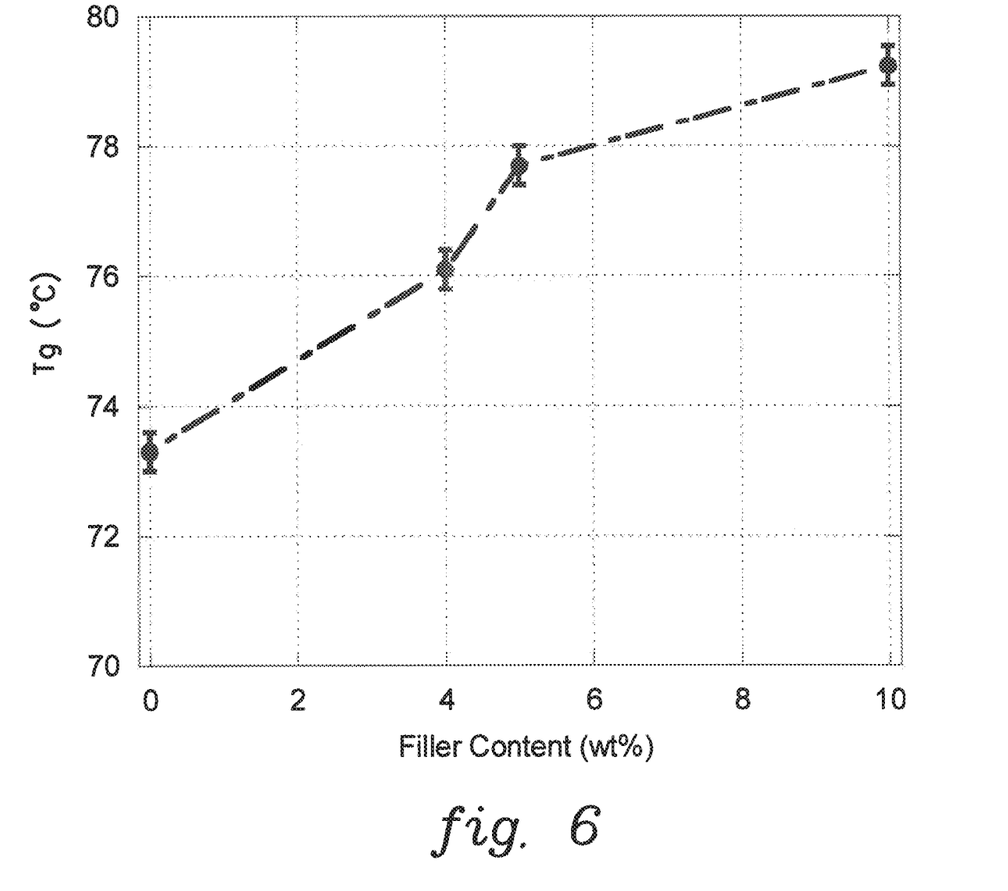
FIG. 6 is a plot of glass transition temperature vs. the percentage of filler in the polyester nanocomposite in accordance with the present invention.

DSC measurements of the glass transition temperatures of PET with different weight fractions of the surface coated nanoparticles are depicted in FIG. 6. The $T_g$ is seen to increase with increasing nanoparticle content, indicating a strong interface between the nanoparticles and the matrix polymer. As controls, as-received nanoparticles were also melt mixed with PET. The glass-transition temperature does not change on addition of the as-received nanoparticles.

Figure 7:
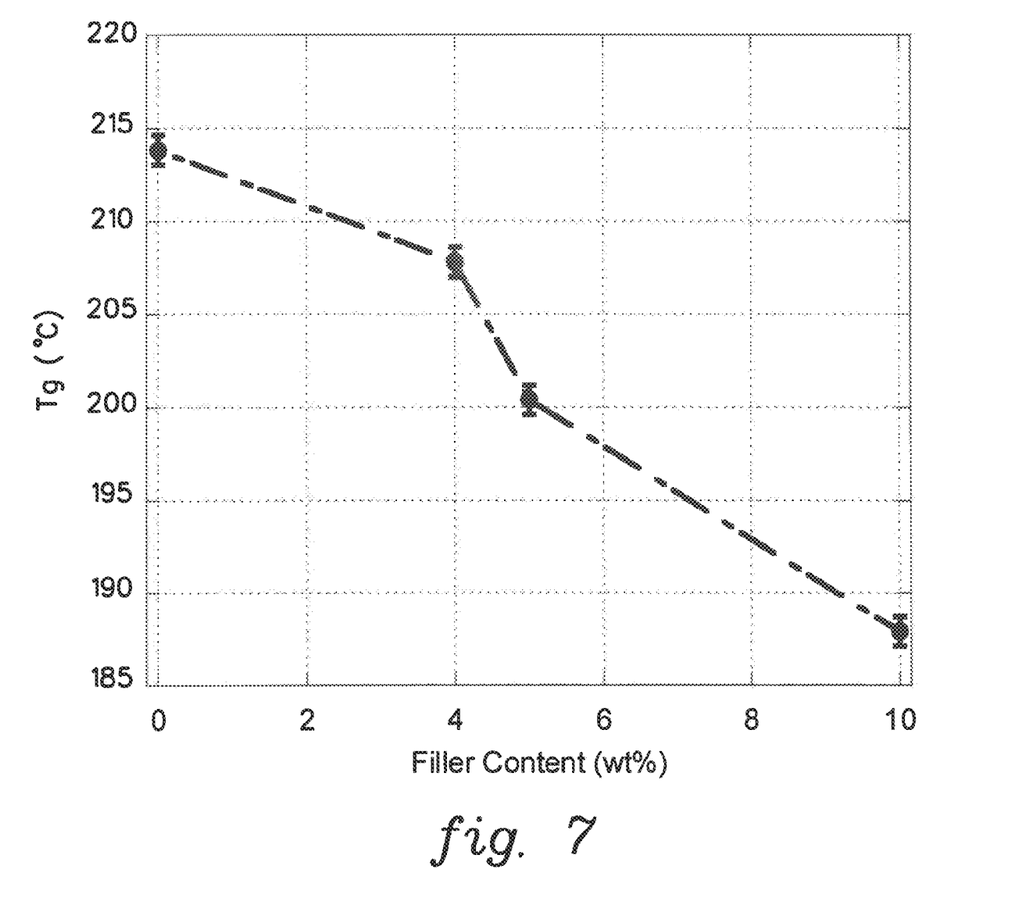
FIG. 7 is a plot of crystallization temperature vs. the percentage of filler in the polyester nanocomposite in accordance with the present invention.

The peak crystallization temperatures from crystallization curves measured using DSC at a cooling rate of 16° C./min from the melt are depicted in FIG. 7. The peak crystallization temperature shifts to progressively lower temperatures with increasing filler content and is 27° C. lower at 10 wt % loading than that of pure PET. Studies in the literature reporting a decrease in crystallization temperature of polyesters have been few. It is generally known in the field of polymer nanocomposites that the presence of fillers leads to an increase in crystallization temperature due to heterogeneous nucleation. An advantage of the method of the present invention is that the opposite occurs. The introduction of a filler results in a decrease in the crystallization temperature.

The foregoing demonstrates that coating the surface of nanoparticles provides a strong chemical link with a matrix polymer. This is in contrast to the common technique of grafting a monomer to a coupling agent adsorbed on the particle followed by polymerization. The strong link is achieved through a chemical reaction between the polymer end group and the coupling agent. The strong interface results in a high percentage of polymer molecules interacting with the nanoparticles, thus leading to substantial increases in the glass transition temperature of the polymer nanocomposite.

What is claimed is:

1. A method for preparing a polyester nanocomposite comprising:
    (a) coating nanoparticles of 1 nm to 100 nm particle size with a dicarboxylic acid, wherein said coating step consists of chemisorption of the dicarboxylic acid onto the surface of nanoparticles via surface hydroxyl groups such that one carboxylic acid group of each dicarboxylic molecule is free;
    (b) combining the dicarboxylic acid coated nanoparticles with a coupling agent resulting in a first mixture; and
    (c) combining the first mixture with a polyester to form a polyester nanocomposite, wherein said polyester nanocomposite has a glass transition temperature greater than the polyester alone and a crystallization temperature less than the polyester alone.

2. The method according to claim 1, wherein the nanoparticles are selected from the group consisting of a metal oxide, a non-metal oxide, a non-metal compound, a semimetal oxide, and a semi-metal compound.

3. The method according to claim 2, wherein the metal oxide is aluminum oxide.

4. The method according to claim 2, wherein the non-metal oxide is silicon oxide.

5. The method according to claim 1, wherein the dicarboxylic acid is selected from the group consisting of terephthalic acid, isophthalic acid, o-phthalic acid, 1,3-naphthalenedicarboxylic acid, 1,4-naphthalenedicarboxylic acid, 4,4'diphenyldicarboxylic acid, 4,4'diphenylsulphonedicarboxylic acid, and diphenyl ether 4,4'-dicarboxylic acid.

6. The method according to claim 5, wherein the dicarboxylic acid is selected from the group consisting of terephthalic acid, isophthalic acid, and o-phthalic acid.

7. The method according to claim 1, wherein the coupling agent is selected from the group consisting of a carbodiimide, an epoxide, and an anhydride.

8. The method according to claim 1, wherein the coupling agent is a carbodiimide.

9. The method according to claim 1, wherein the polyester is selected from the group consisting of poly(ethylene terephthalate), poly(cyclohexylenedimethylene terephthalate), poly(ethylene dodecate), poly(butylene terephthalate), poly(ethylenenaphthalate), poly(ethylene 2,7-naphthalate), poly(methaphenylene isophthalate), poly(glycolic acid), poly(ethylene succinate), poly(ethylene adipate), poly(ethylene sebacate), poly(decamethylene azelate), poly(decamethylene sebacate), poly(dimethylpropiolactone), poly(ethylene isophthalate), poly(tetramethylene terephthalate), poly(hexamethylene terephthalate), poly(decamethylene terephthalate), poly(1,4-cyclohexane dimethylene terephthalate) (trans), poly(ethylene 1,5-naphthalate), poly(ethylene 2,6-naphthalate), and poly(1,4-cyclohexylene dimethylene terephthalate).

10. The method according to claim 1, wherein the polyester is poly(ethylene terephthalate).

11. The method according to claim 1, wherein the nanoparticles are aluminum oxide, the dicarboxylic acid is terephthalate acid, and the coupling agent is polycarbodiimide.

12. The method according to claim 1, wherein the polyester nanocomposite comprising from 4% to 10% by weight of the first mixture containing the coated nanoparticles and the coupling agent.

13. The method according to claim 1, wherein the polyester is selected from at least one of a polyester copolymer and a polyester-polymer mixture.

14. A method for preparing a polyester nanocomposite comprising:
    (a) coating nanoparticles with a dicarboxylic acid, wherein said coating step consists of chemisorbtion of the dicarboxylic acid onto the surface of nanoparticles via surface hydroxyl groups such that one carboxylic acid group of each dicarboxylic molecule is free;
    (b) combining the dicarboxylic acid coated nanoparticles with a coupling agent resulting in a first mixture; and
    (c) combining the first mixture with a polyester to form a polyester nanocomposite, wherein said polyester nanocomposite has a glass transition temperature greater than the polyester alone and a crystallization temperature less than the polyester alone.

* * * * *